April 27, 1965  O. C. NIEDERER  3,180,295
SUBMARINE SIMULATOR
Filed Jan. 23, 1961  18 Sheets-Sheet 2

INVENTOR.
OTTO CHRISTOPHER NIEDERER
BY
Lawrence S. Epstein
ATTORNEYS

INVENTOR.
OTTO CHRISTOPHER NIEDERER
BY
Laurence S. Epstein
ATTORNEY

INVENTOR.
OTTO CHRISTOPHER NIEDERER
BY
Lawrence S. Epstein
ATTORNEY

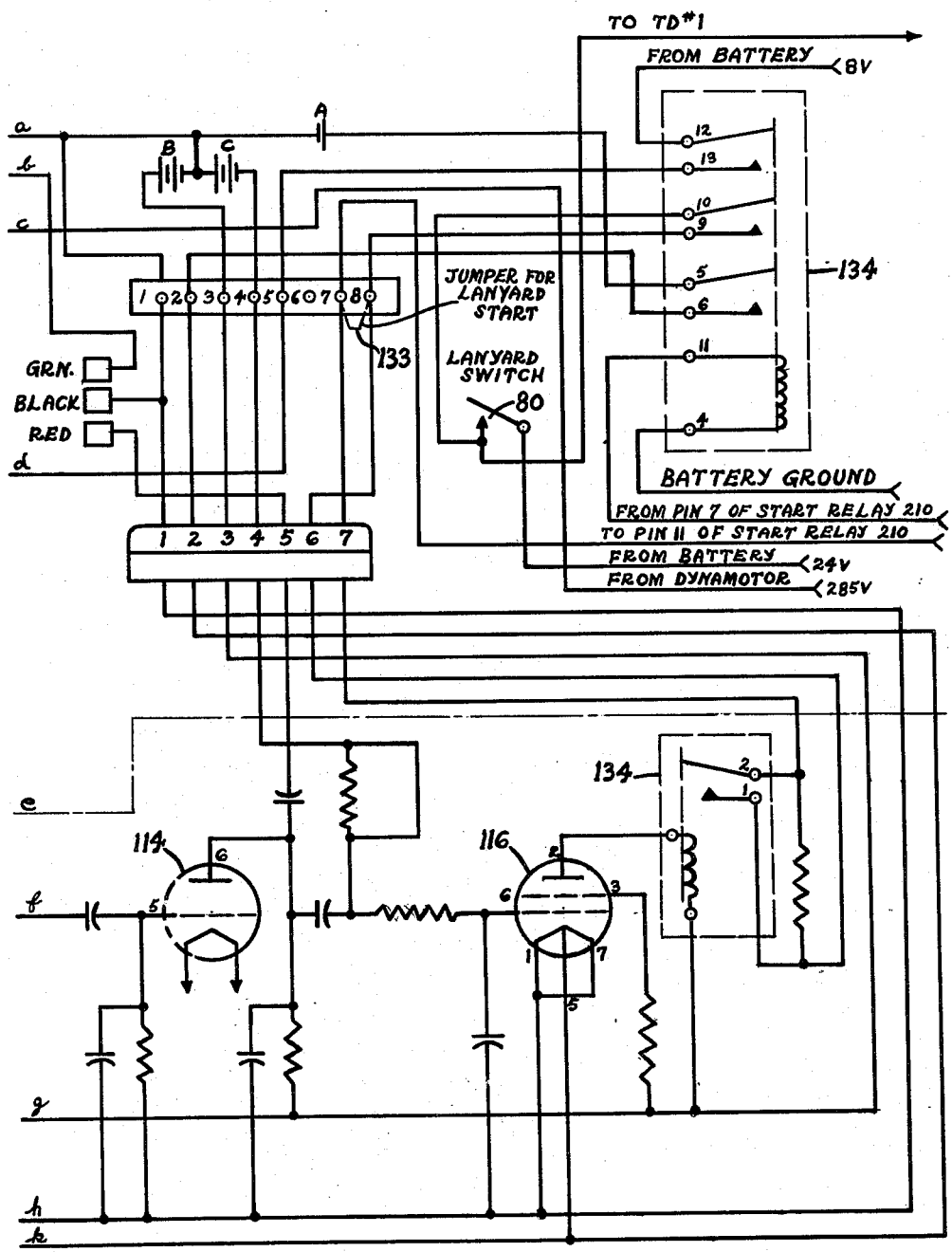

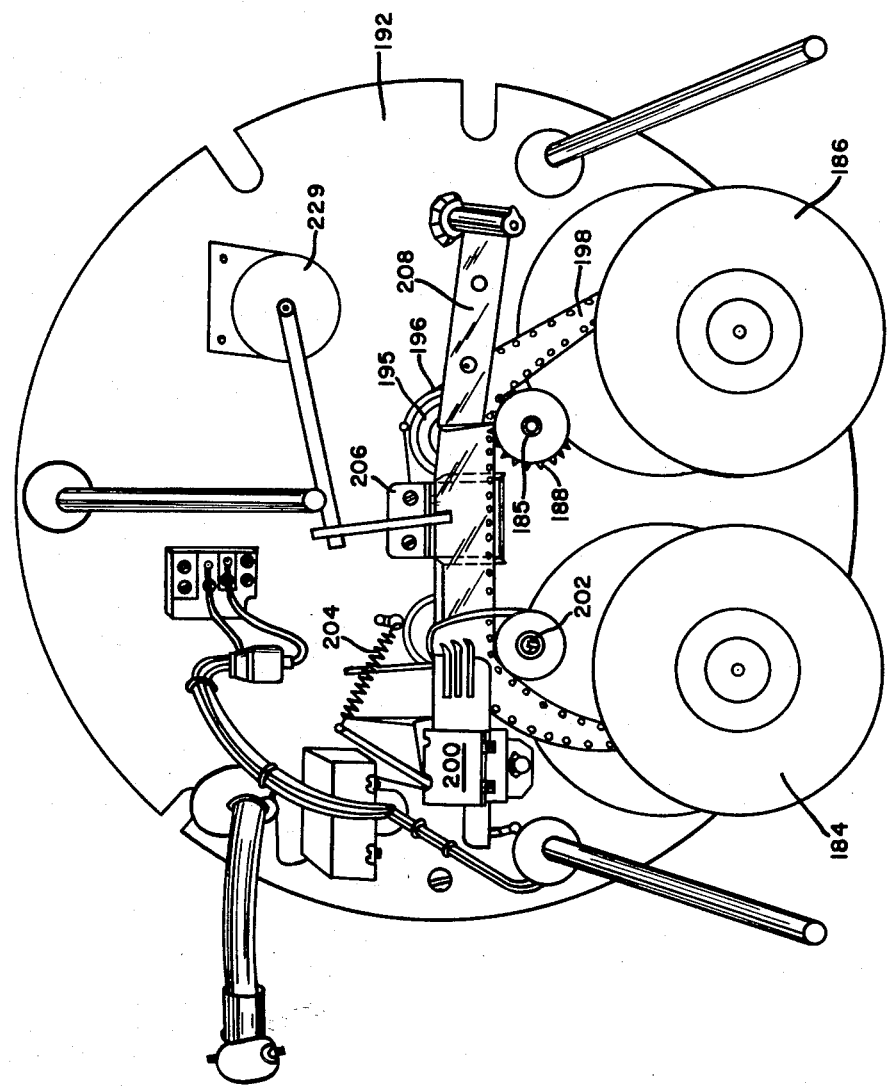

April 27, 1965

O. C. NIEDERER 3,180,295

SUBMARINE SIMULATOR

Filed Jan. 23, 1961

INVENTOR.
OTTO CHRISTOPHER NIEDERER

BY

Lawrence S Epstein
ATTORNEYS

INVENTOR.
OTTO CHRISTOPHER NIEDERER
BY
Lawrence S. Epstein
ATTORNEY

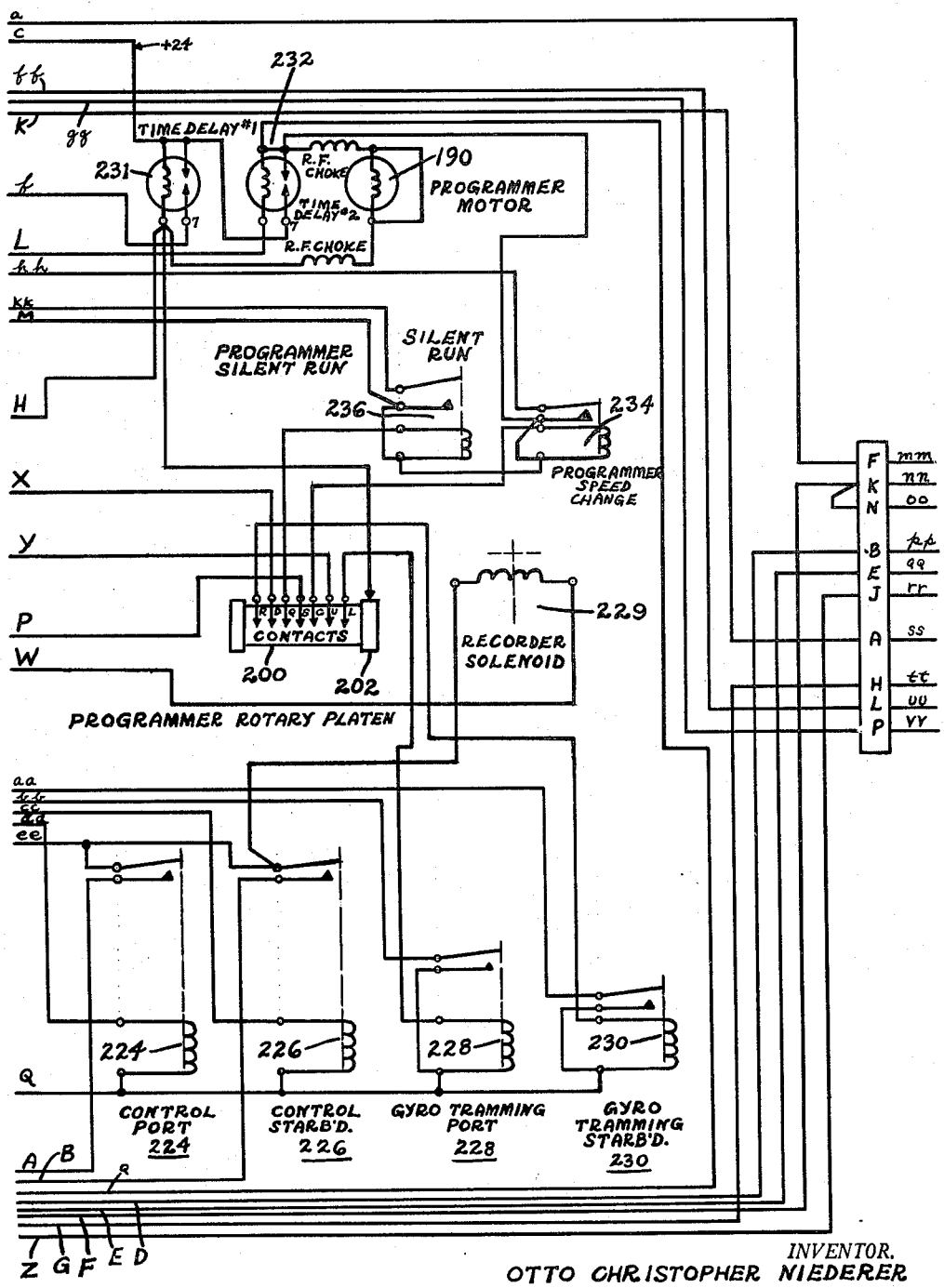

April 27, 1965 O. C. NIEDERER 3,180,295
SUBMARINE SIMULATOR
Filed Jan. 23, 1961 18 Sheets-Sheet 13

INVENTOR.
OTTO CHRISTOPHER NIEDERER
BY
Lawrence S. Epstein
ATTORNEY

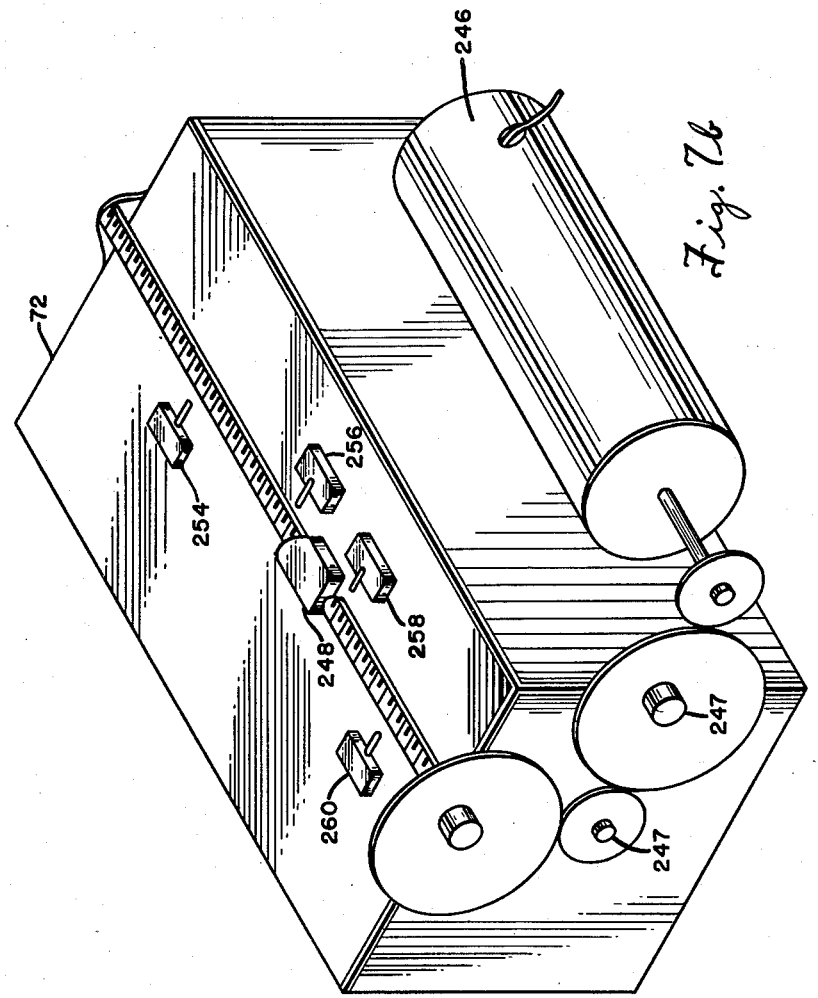

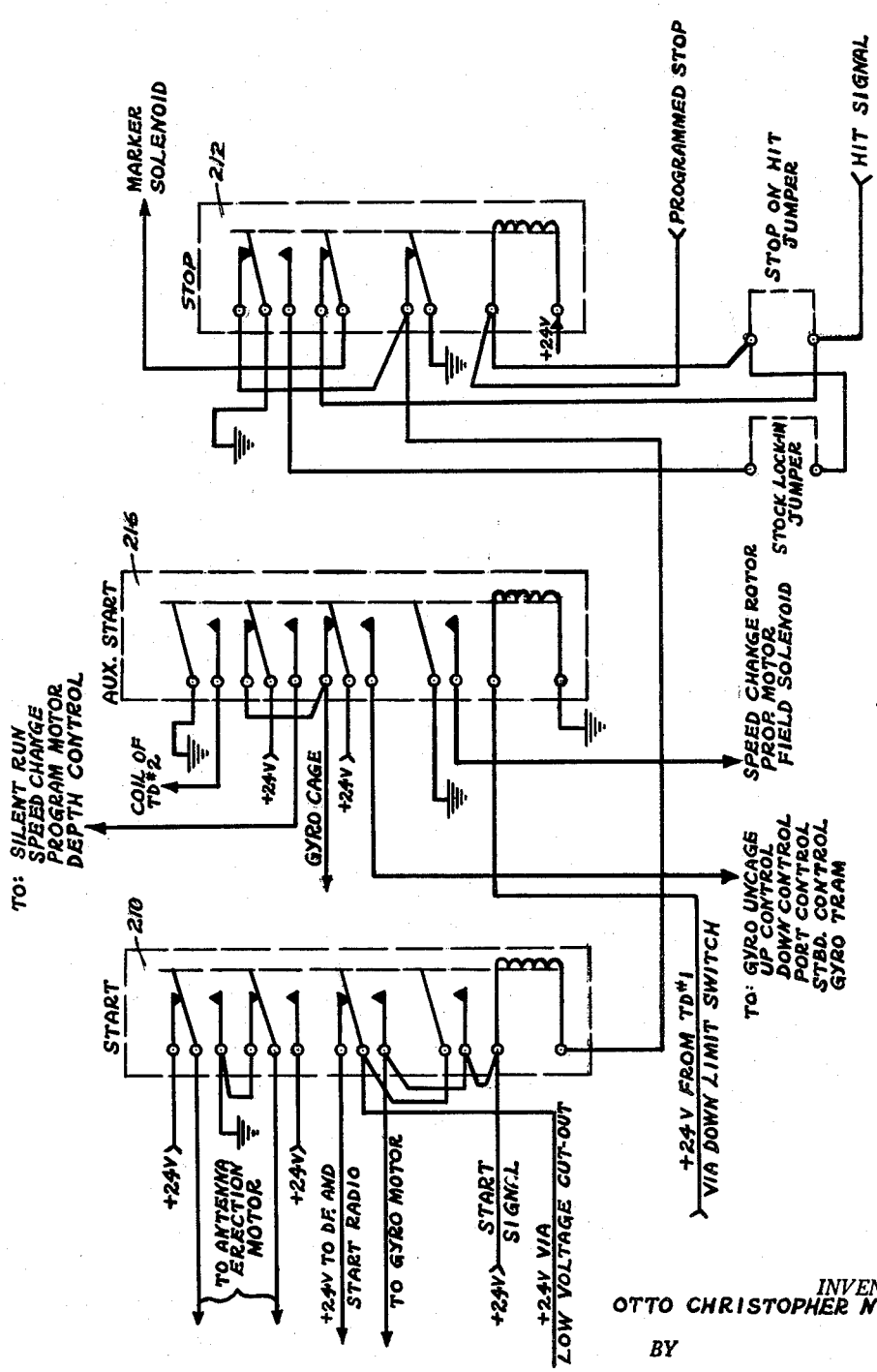

April 27, 1965     O. C. NIEDERER     3,180,295
SUBMARINE SIMULATOR

Filed Jan. 23, 1961     18 Sheets-Sheet 17

INVENTOR.
OTTO CHRISTOPHER NIEDERER
BY
Lawrence S. Epstein
ATTORNEY

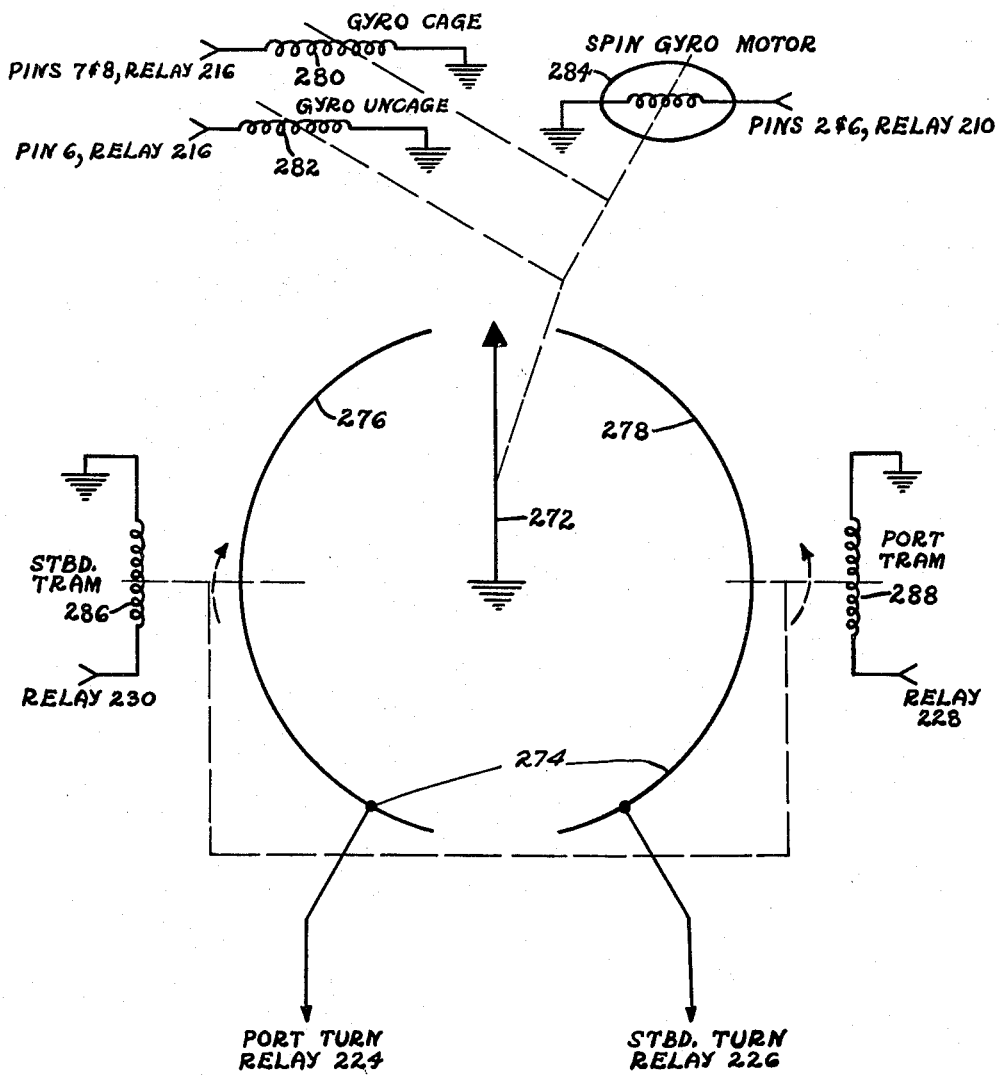

3,180,295
SUBMARINE SIMULATOR
Otto Christopher Niederer, Westfield, N.J., assignor, by mesne assignments, to the United States of America as represented by the Secretary of the Navy
Filed Jan. 23, 1961, Ser. No. 84,467
9 Claims. (Cl. 114—20)

The present invention relates to decoy apparatus and more particularly applies to apparatus to be used in a liquid medium such as the ocean to simulate motions, size and noise of an underwater craft. Prior to this invention devices for simulating underwater craft had many deficiencies. Among these deficiencies were great bulk, incapability of going through maneuvers, inability to be started except by mechanical means and lack of versatility. The present device overcomes these defects by providing a submarine decoy which is very versatile and capable of going through any submarine maneuvers desired, is small in size, can indicate depth charge hits, can be started by lanyard or remotely by radio, is capable of running at two speeds in any type of a planned run and gives a direction-finding radio signal to aid in locating the device at the end of a run. This device is recoverable and therefore is low in cost.

It is a primary object of the invention to provide a submarine target by simulating the appearance of a submarine to sonar and radar apparatus.

Another object of the invention is to provide a low cost submarine decoy.

A further object of the invention is to provide a submarine decoy which is small in size and is capable of going through desired maneuvers, can indicate depth charge hits, can be started by lanyard or remotely by radio, is capable of running at two speeds in any type of planned run, and gives a direction-finding radio signal to aid in locating the device at the end of a run.

Another object of the invention is to provide a device which is capable of executing the difficult maneuvers of a submarine in accordance with instructions pre-punched into a programming tape.

Another object of the invention is to provide a decoy device which is capable of simulating different submarine keel depths.

A further object of the invention is to provide a device which simulates the noise of a submarine electronically.

Another object of the invention is to provide a device which simulates the echo from a real submarine.

A further object of the invention is to provide a device which generates a sonar signal and reflects a radar signal which is similar to that produced by a submarine snorkel.

A further object of the invention is to provide a device which can eject any, or a combination of, the following types of markers: yellow or any other color buoyant disks; oil for simulating an oil slick; and a buoyant dye cartridge which rises to the surface and allows the dye to diffuse.

Other objects and many of the attendant advantages of this invention will be readily appreciated as the same becomes better understood by reference to the following detailed description when considered in connection with the accompanying drawings wherein:

FIGS. 4a and 4b are schematic diagrams of the high frequency transmitter and receiver used for starting and direction finding;

FIGS. 5a and 5b show the programmer;

FIGS. 6a through 6f are a detailed schematic diagram of the electrical control circuitry for the simulator;

FIGS. 7a and 7b show the mechanical arrangement of the depth control assembly;

FIG. 8 is a schematic diagram of the start-stop circuit;

FIG. 10 is a schematic diagram of the gyro stabilizer for the simulator.

Figure 1:
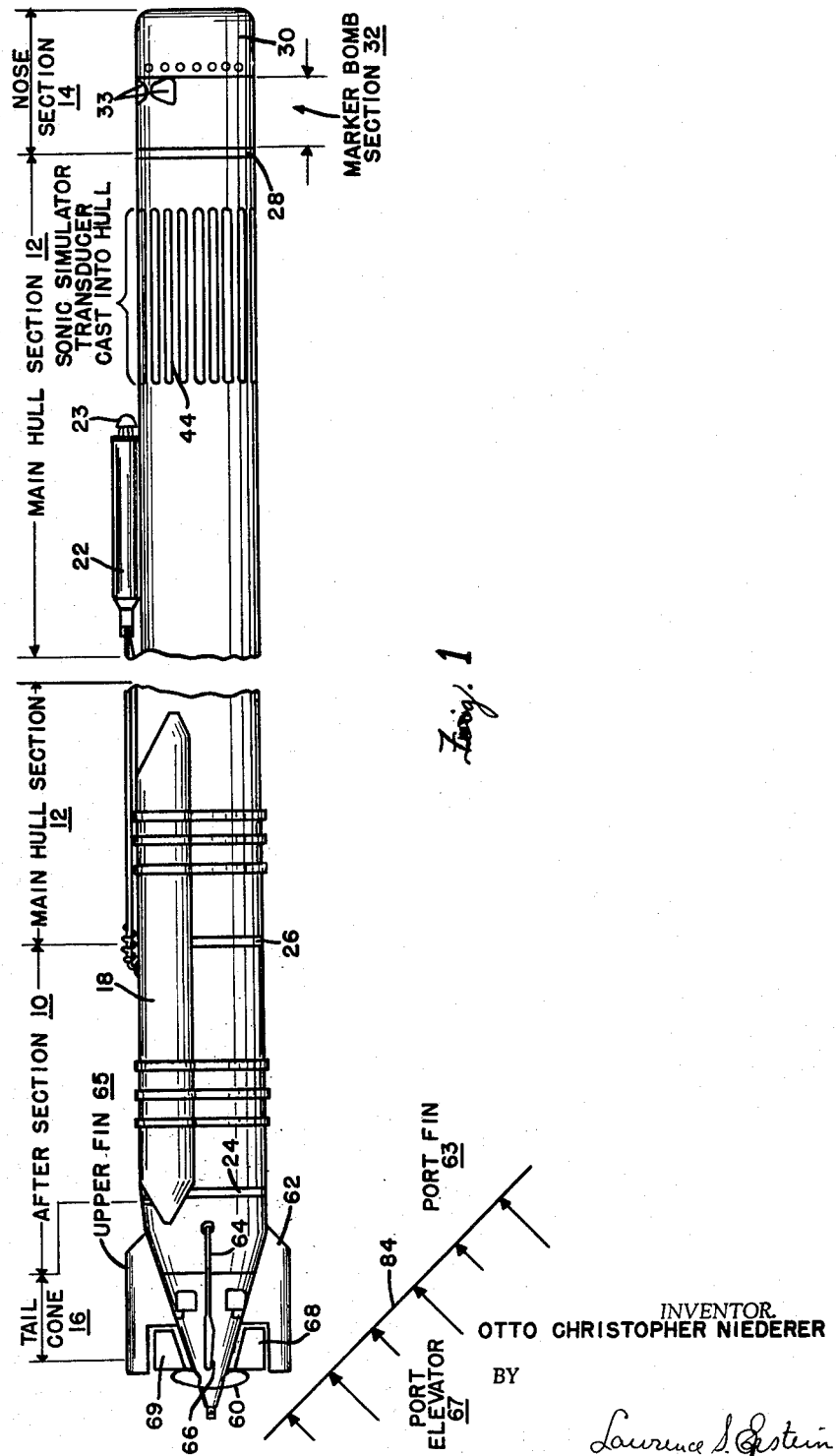
FIG. 1 is an external view of the submarine target decoy.
Figure 2:
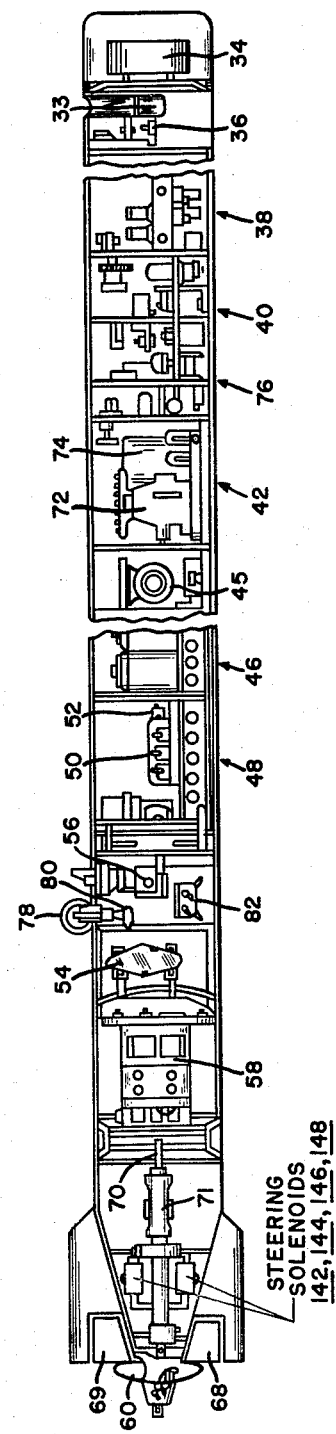
FIG. 2 is a sectional view of the submarine target decoy.

Referring to FIG. 1, the torpedo-like device comprises an after section 10, a main hull section 12, a nose section 14 and a tail cone 16. The main hull section 12 is made of fiberglass reinforced plastic. All other sections are made of salt water resistant stainless steel. Saddle tanks 18 are mounted on the main hull and after body sections to provide stability when the device is immobile on the surface of the water. The leading end 20 of the saddle tanks are cut at an angle to assist the device in submerging. The saddle tanks are made of a plastic material and are filled with a very light weight from plastic to preserve their positive buoyancy in the event they are ruptured, or they may be constructed of solid pieces of suitable wood. A plastic capsule 22 is mounted above the main hull and houses a radar reflector 23 which serves also as an antenna. Each of the sections of the device is joined together by joint bands. These joint bands are respectively 24, 26 and 28. The nose section 14 comprises a hydrophone shell 30 and marker bomb section 32. The marker bomb section is comprised of a four-barreled marker bomb magazine 33, which can eject any or a combination of the following types of markers: (a) colored buoyant disks; (b) oil for simulating an oil slick; (c) a buoyant dye cartridge which rises to the surface and allows the dye to diffuse. The marker ejector assembly is described in detail in Patent No. 3,034,227, issued May 15, 1962. Ejection of these materials occurs when a depth charge is dropped sufficiently close to the simulator to be considered within the homing range of an acoustic torpedo. This feature gives a visual indication of a hit to the personnel who have been tracking the device in surface ships or in aircraft. Alternate method of hit indication may be selected. With one mode of operation, the simulator is caused to rise to the surface and suspend operation when a "hit" is made. Following such a stoppage, the program may be started again by radio. The program in this case begins at the point where it was interrupted. When a "hit" is made it is recorded on the program tape, allowing later analysis of when "hits" were made during the training exercise. The marker bombs may be used optionally to mark the end of an exercise or the end of a portion of an exercise. Also contained in the nose section 14 is a crystal transducer which receives sonar pulses. This crystal transducer is part of the receiving hydrophone 34 which is shown in FIG. 2. A low voltage cutout protector device 36 which shuts off power in the event insufficient battery voltage is available, is also contained in the nose section. The main hull section 12 houses an echo repeater chassis 38 for repeating sonar pulses, a sonic simulator 40 for electrically generating noises typical of submarine noises and a submarine package 42 for carrying out the functions of the officers and crew of an operating submarine. A magneto-strictive transducer 44 is cast into the main hull to convert the electrically-made submarine noise signals into underwater sound signals. A dynamotor 45 is located in the central section of the main hull. This dynamotor, running on low voltage, is used to generate the high voltages needed in the electronic sections. The propulsion battery 46 is housed in a tray in the after section of the main hull. This tray also holds the high frequency package 48 which is comprised of a radio receiver 50 for receiving starting signals and a transmitter 52 for generating direction finder signals. The after section of the hull 10 contains the receiving and transmitting transducer 54 for the echo elongator and a small motor driven assembly 56 for erecting and lowering the radar reflector 23. The afterbody section also houses the propulsion motor 58. The tail cone assembly 16 houses the steering solenoids 142, 144, 146 and 148 and gives support to the fins 62, 63, 64 and 65, elevators 66 and 67, and the rudders 68 and 69, the propulsion motor bearings 70, the propulsion motor 58, the shaft coupling 71, propeller shafts, and the propellers 60.

A submarine package 42 is the control center for all the functions of the device and is comprised of three major elements. These are the depth control 72, the course gyroscope 74 and the programmer 76. The depth control 72 determines the running depth of the device. Four nominal running depths are possible: surface 100 feet, 150 feet and 200 feet. If desired, other depths than these may be chosen. The rate of change of depth is fixed and is determined by the speed of operation of a depth control motor 246 and by the orientation of mercury dive angle 270 and the climb angle limit switches 266. The course gyroscope 74 performs the function of determining the orientation of the device in azimuth. The gyroscope will provide excellent course control, the position of the device at any time can be predicted from the punched program. In water having no currents this is relatively simple. However, since surface and underwater currents may flow at speeds similar to the low speed of the device, the actual course over the ground may be hard to predict. The programmer 76 utilizes perforated plastic tape to provide intelligence for controlling the device. If the tape should tear, the device will stop and surface, erect its antenna 23 and transmit a direction-finding signal, and in all other ways function as if the stop were programmed. It will not be possible to again start the device in this situation.

The antenna erection mechanism 56 is tied in with the lanyard start switch 80 and the starting circuit for the device. When launched from a helicopter, the lanyard switch opener ring 78 is pulled thereby closing the lanyard start switch 80 to provide power to circuits for the erection of the radar reflector 23, the radio receiver and direction-finder beacon antennas. The device will then lie dormant on the surface of the water awaiting a radio start signal. While on the water surface the device will be sending out a direction-finder radio signal, reflecting radar, and making submarine noises.

In operation the device is capable of executing typical maneuvers of a submarine in accordance with instructions pre-punched into a programming tape. The program may be varied in length up to a maximum time determined by the capacity of the batteries. Provision is also made for carrying out as many short programs as is desired within this battery capacity limit. The device can be launched and recovered by a helicopter. It may be started during dropping by a lanyard switch or it may be started remotely by a radio signal of the proper frequency. The nominal running speed for the device is four knots; however, provision is made for bursts of speed at ten knots. Operation at ten knots will rapidly reduce the overall running time. The high speed running intervals should be of short duration, not to exceed five minutes, due to the fact that electrical losses in the propulsion motor cause overheating of the motor and the high speed running periods must be separated by cooling off intervals. This cooling off can be done while running at a low speed. The length of low speed run is limited only by the capacity of the batteries. The submarine characteristics which have been built into this device are as follows:

*Operational programming*

The device may be programmed to turn port or starboard at selected rates of turn commensurate with rates encountered in the operation of submarines. Changes in depth can be programmed to simulate submarine keel depths of 100, 150 and 200 feet. The target simulator floating on the surface cannot provide the keel depth of an actual surfaced submarine; however, the depth increments mentioned above can be changed with ease by adjusting the location of the depth selector microswitches 254, 256, 258 and 260 to simulate any four keel depths down to 200 feet. A minor alteration consisting of substitution of a stiffer spring 242 in the depth control unit permits the selection of keel depths greater than 200 feet, down to the crushing depth of the simulator target hull. Directional changes in azimuth are programmed in five degree increments port or starboard. These five degree commands may be programmed close together for simulating tight circles or they may be spaced to provide turns of very great radius.

Figure 5B:
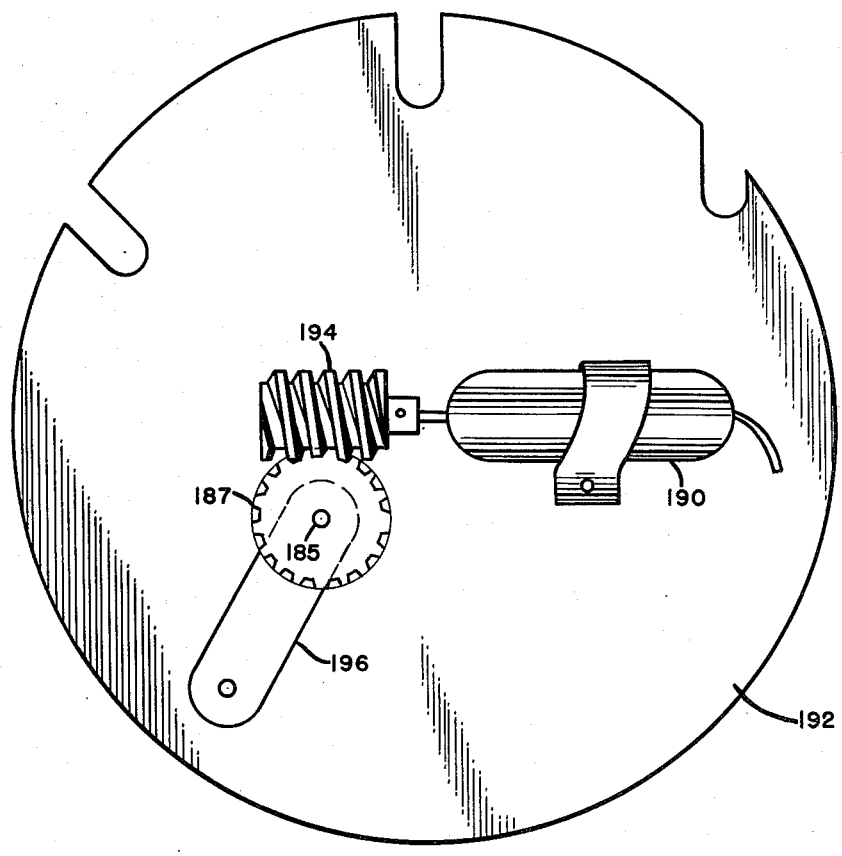
Figure 6A:
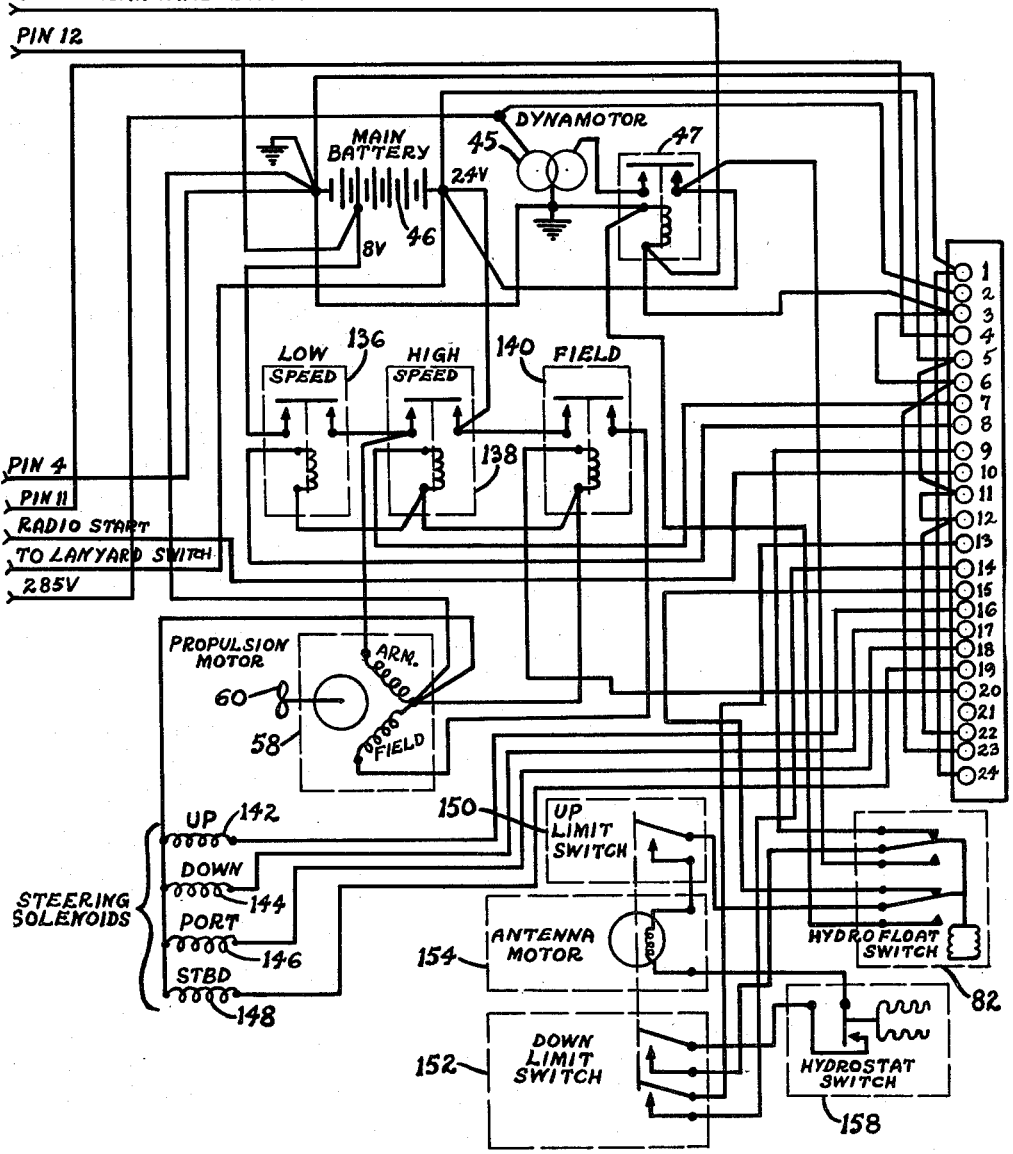
Figure 6B:
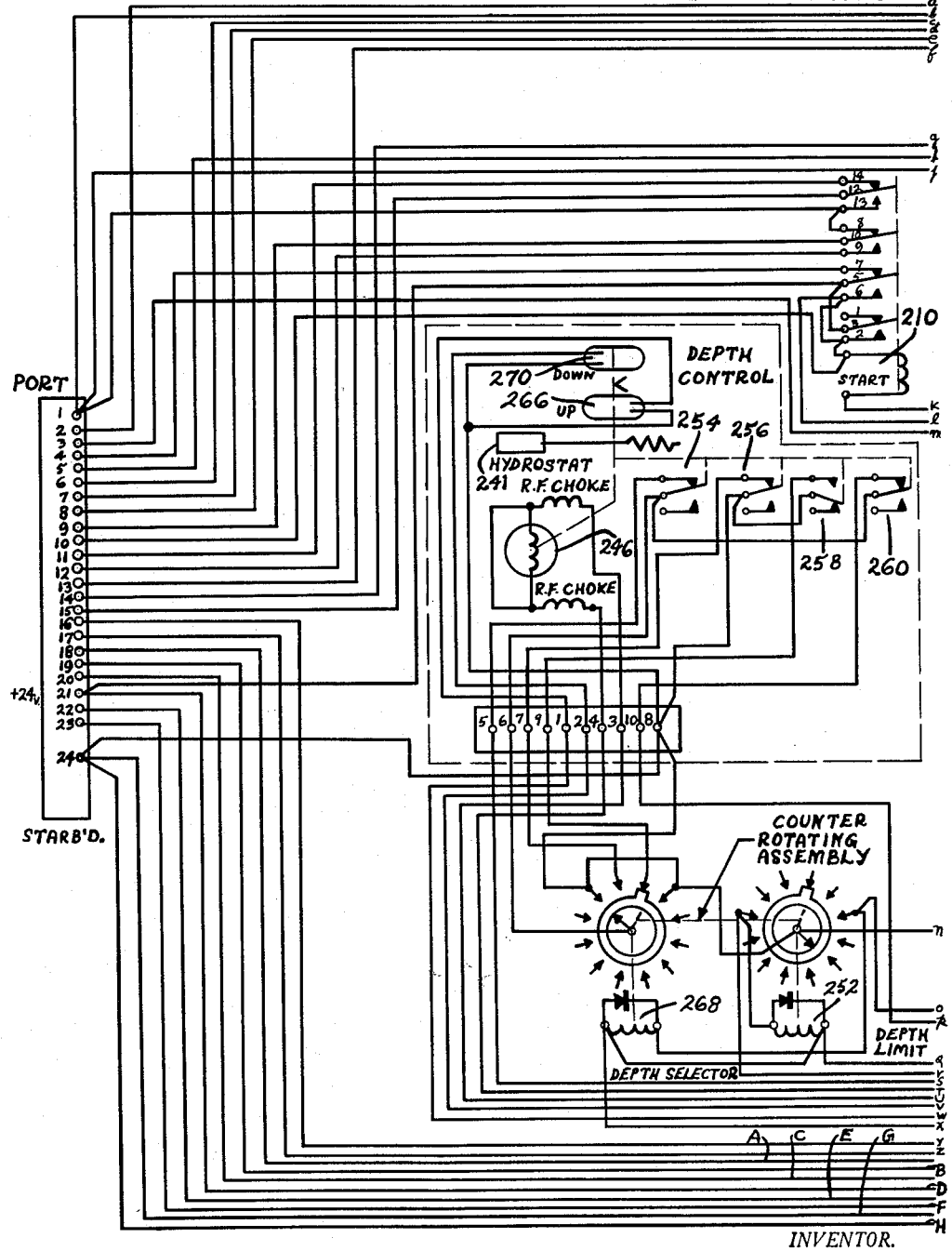
Figure 6D:
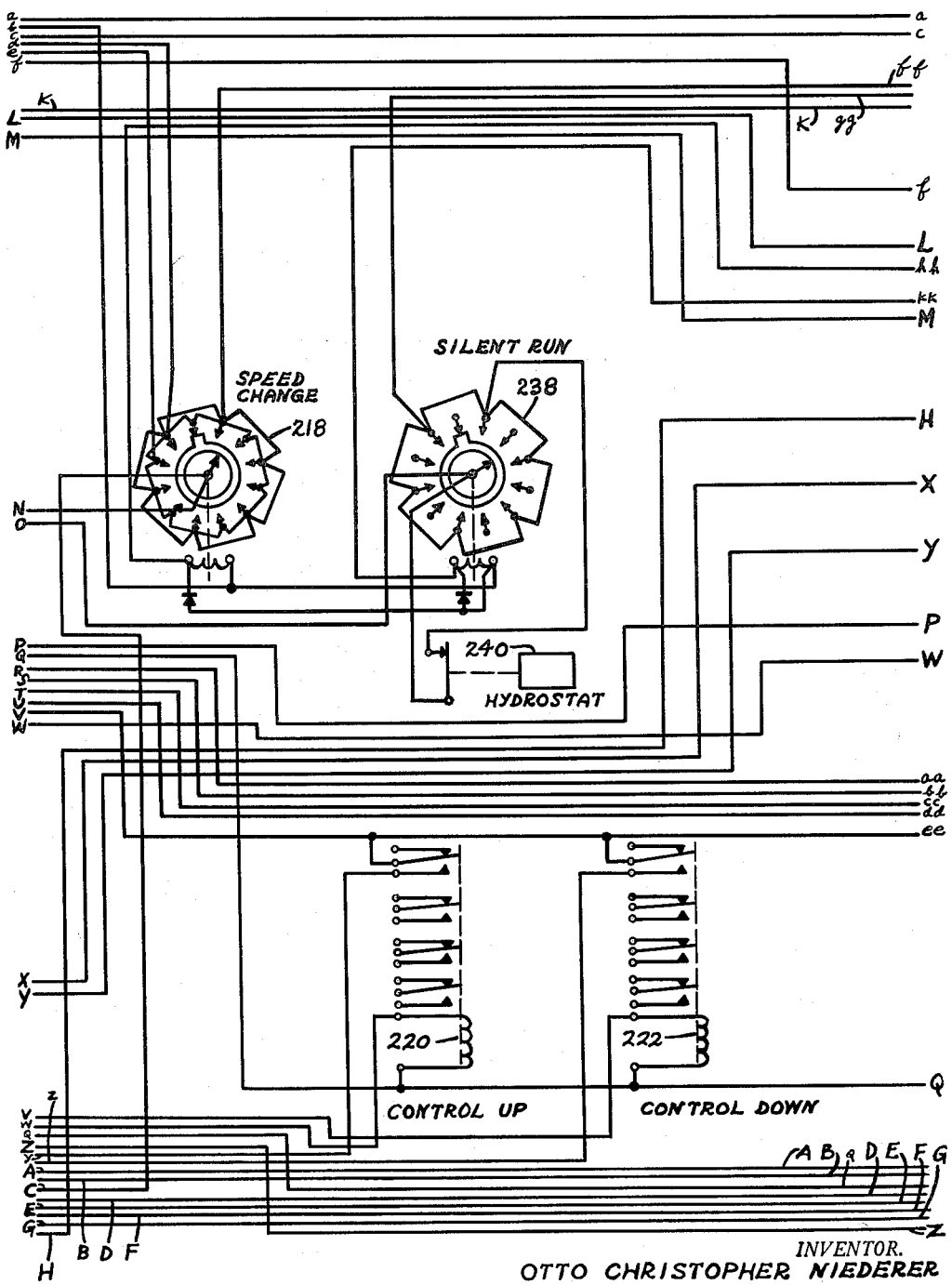
Figure 6C:
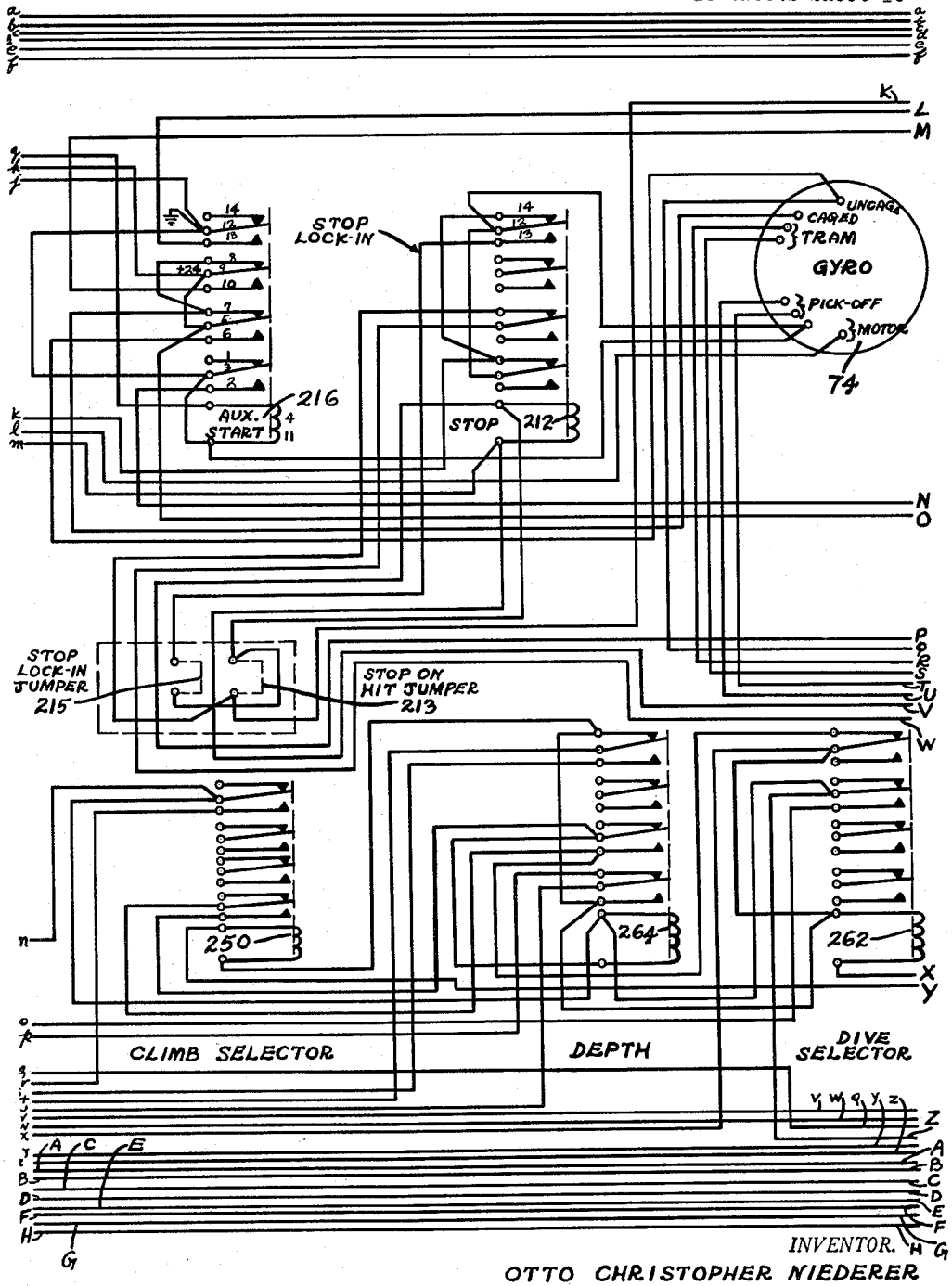
Figure 6F:
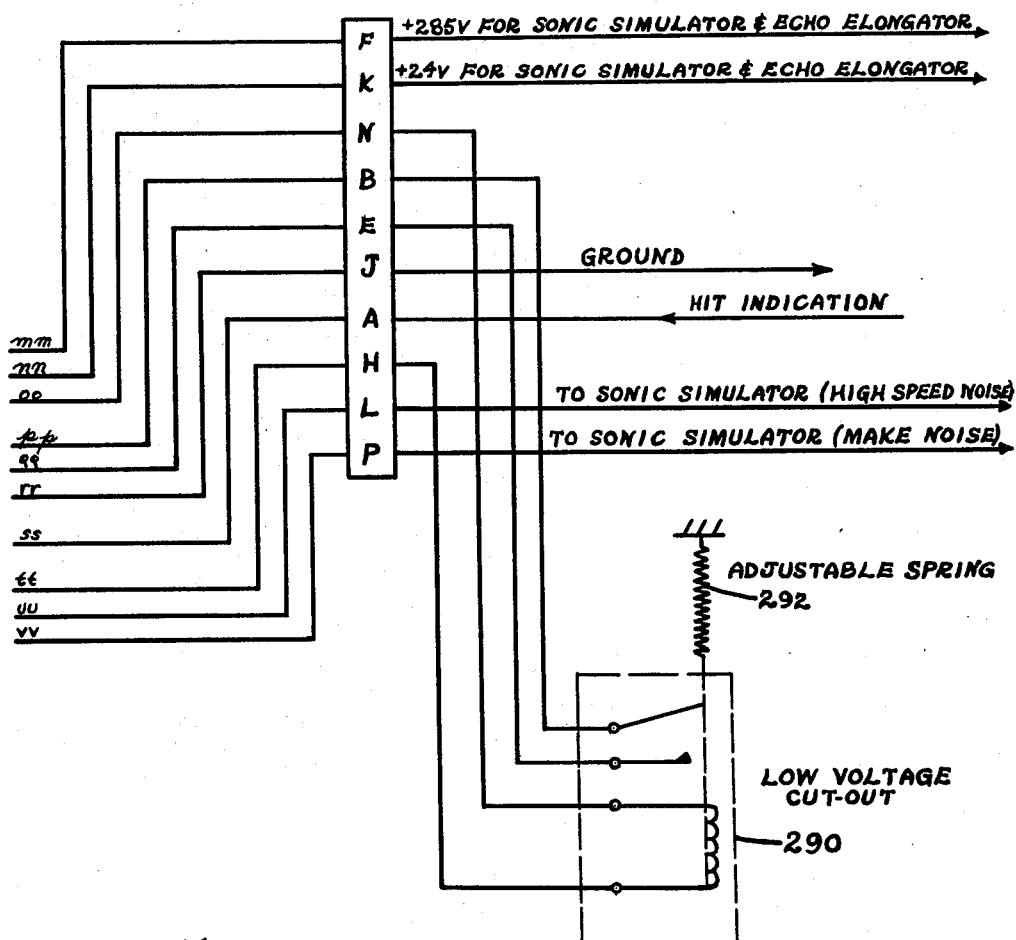

The programmer is shown in detail in FIGS. 5a and 5b, and the associated circuitry is shown on schematic diagram FIGS. 6a–6f.

The programmer 76 comprises a supply reel 184 which has a punched 35 mm. program and a take-up reel 186 and a drive sprocket 188. The details of the programmer motor drive circuit are shown in FIGS. 6a–6f. The programmer drive motor 190 is rigidly mounted to circular plate 192. The drive shaft of programmer motor 190 has worm gear 194 which meshes with sprocket drive gear 187. Connected to this gear is a shaft 185 through plate 192 which turns the drive sprocket 188. Also mounted on the shaft 185 is a pulley 195 which drives belt 196. Belt 196 drives the take-up reel 186 at such a speed that the film strip 198 is wound up on an empty take-up reel as fast as it is driven by a sprocket 188. As reel 186 fills up with film, the drive belt 196 slips, thereby never allowing slack between the drive sprocket and take-up reel, but not pulling film faster than the speed of the sprocket drive.

The program is punched into a 35 mm. acetate film strip 198. Element 200 has seven metal contact fingers which ride on the upper surface of film strip 198. Whenever a punched hole appears under one of these metal fingers, the finger contacts rotary metal contact 202, thereby completing an electrical circuit and sending an electrical signal to the appropriate control relay. Finger element 200 is kept under tension to assure positive contact of the fingers with the rotary contact by means of spring 204. Platen 206 and spring tension arm 208 maintain the film in alignment with tape sprocket drive 188.

The operation of the programmer is as follows:

*Start*

Figure 4A:
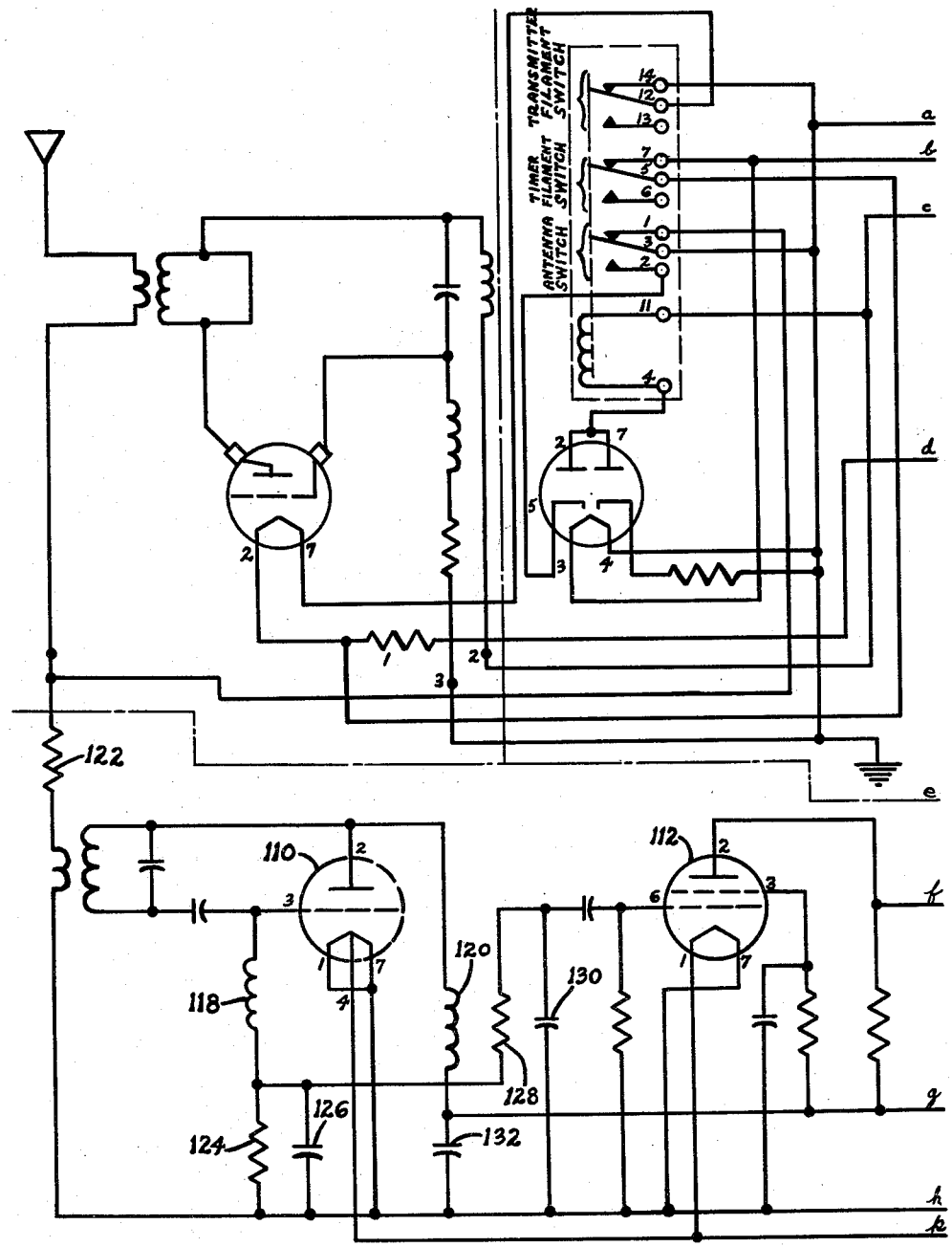

Start relay 210 energizes when plus 24 volts is applied to its contact 11. This 24 volts is supplied from the radio start relay 134, FIGS. 4a and 4b, or directly from the lanyard switch 80 if lanyard start jumper 133 is in place. Relay 210 then locks in through its own 3–2 contacts. The circuit is completed to ground through the 1–3 and 14–12 contacts of stop relay 212. The erection motor controlling the antenna and erection circuit is described in detail in Patent No. 3,106,712 issued October 8, 1963. The antenna retracts by being supplied voltage of the proper polarity via the 13–12 and 9–10 contacts of relay 210. The 7–5 contacts open, removing power from the radio start receiver and the direction finder radio. At the same time the 5–6 contacts of start relay 210 close, thereby applying operating voltage to spin gyroscope motor 284. The erection motor 154 for the antenna stops in the antenna-down position due to the fact that the motor circuit is broken by the opening of contacts 1–3 of the down limit switch 152. The auxiliary start relay 216 is energized via its contact 11 and ground on contact 4 by the closing of contacts 2–3 of the down limit switch. Contacts 3–2 of auxiliary start relay 216 close to complete the propulsion motor field solenoid 140 circuit and the motor high speed solenoid 138 circuit via the speed change rotary solenoid 218 (the speed change relay solenoid must initially be set in the high sped position for immediate diving of the device).

Contacts 5–6 of auxiliary start relay 216 supply 24 volts to the gyroscope 74 uncage coil 282 and the gyroscope thereby uncages. Voltage is also supplied to the coils of up control relay 224, control starboard relay 226, gyro tramming port relay 228, and gyro tramming starboard relay 230. Contacts 9–10 of the auxiliary start relay 216 close to supply 24 volts to start the program motor 190, and voltage is also supplied to the coil and contact finger of the silent run relay 236, the coil and contact finger of the speed change relay 234, the depth selector coils 268, and 252 of the bi-directional rotary relay 253, the coil and contact finger of dive selector relay 262, the contact fingers of depth relay 264 and the coil of the climb selector relay 250. Contacts 12–13 of auxiliary start relay 216 close to ground the coil of time delay number 2 relay 232 which now energizes to close its 5–7 contacts. These contacts then stay closed for 30 seconds after the end of the program to assure clearance of all stop commands on the program tape by causing the program motor 190 to run for an extended period. This precludes a false stop at the beginning of a new program while at the same time utilizing the assurance of multiple stop commands. Since the antenna is in the down position when the device is launched, the auxiliary start relay would close as soon as the lanyard switch was operated. To prevent this, time delay number 1 relay 231 is included in the device. The power to operate the auxiliary start relay 216 is taken from the number 7 contact of time delay number 1 relay, 30 seconds after the lanyard switch has been operated. This allows the anntenna time to erect and receive a radio start signal, or in the case of lanyard start, it allows time for the gyro motor to get up to speed before being uncaged. The circuit from contact 7 of time delay number 1 relay 231 is via the down limit switch 152 of the antenna erection mechanism 56 and then to the coil of the auxiliary start relay 216.

*Speed change*

The speed change contact finger (C) of the programmer finger element 200 makes contact with the grounded platen 202 thus providing a ground and a complete circuit to the coil of the programmer speed change relay 234. The activation of relay 234 via its 1–3 contacts places 24 volts on the coil of the speed change rotary solenoid 218 completing its circuit for a sufficient length of time for it to make one step. Alternate contacts of the speed change rotary solenoid 218 complete the circuit to the low speed solenoid 136, placing eight volts on the armature causing the propulsion motor 58 to decrease speed. The alternate contacts of speed change rotary solenoid 218 complate the circuit to the low speed solenoid 136, placing eight volts on the armature causing the propulsion motor 58 to decrease speed. The alternate contacts of speed change rotary solenoid 218 are wired to energize the high speed solenoid 138 placing 24 volts on the armature of the propulsion motor 58. Two other functions occur simultaneously with speed changes. These are appropriate changes in amplitude and frequency of the sonic simulation. These changes are accomplished by operating a relay mounted on the sonic simulator chassis 40. Current to this relay is switched by the speed change rotary solenoid 218.

*Quiet operation*

When the Q finger of the programmer finger element 200 contacts the platen 202, the coil circuit for the silent run programmer relay 236 is completed. Contacts 12–13 of the relay close to complete the circuit to the silent run rotary solenoid 238. Contacts of this solenoid apply 24 volts to the filaments of the sonic simulator 40. With this circuit closed, the sonic simulator puts out simulating noises. When this circuit is open, the device is quiet. Hydrostat switch 240 which is closed on the surface but open at deeper than five feet, assures operation of the sonic simulator while the unit is on the surface. This assures operation of the sonic simulator, to aid in locating the device, whether or not a quiet operation was programmed when the device stopped.

*Azimuth control*

When start relay 210 closes, the gyro motor 284 starts spinning and is up to speed by the time the auxiliary start relay 216 closes, activating the gyro uncage coil 282. The gyro pointer 272 is now fixed in space. If the device turns to port, due to external forces, the gyro split commutator 274 moves with it, making contact between the starboard half 278 of the commutator and the fixed-in-space gyro pointer 272, this completes the circuit to the coil of the starboard control relay 226, which through its 12–13 contacts supplies power to the starboard steering solenoid 148, causing the device to turn to starboard until it is back on its original heading. In a similar manner a starboard turn is corrected by circuits through the fixed-in-space pointer 272, the port commutator ring 276, port control relay 224 and the port steering solenoid 146.

When a course change is programmed, say to port, the P contact of the programmer finger element 200 makes contact with the rotary platen 202 causing the port tramming relay 228 to be activated, this in turn through its 5–6 contacts causes the port tramming solenoid 288 to operate which rotates the gyro split commutator 274 5° to port relative to the body of the device. This is now seen by the gyro pointer 272 as a 5° error to starboard and as above, the device turns to port until the pointer is in the null position of the split gyro commutator. The device has now made a 5° turn to port. The total amount of the turn is determined by the number of 5° increments programmed, and the rate is determined by the timed spacing between these 5° increments. Turns to starboard are accomplished in a similar manner using the starboard turn finger(s) of the programmer finger element, activating the starboard tramming relay 230, and the starboard tramming solenoid 286 of the gyro, etc.

*Depth control*

Figure 7A:
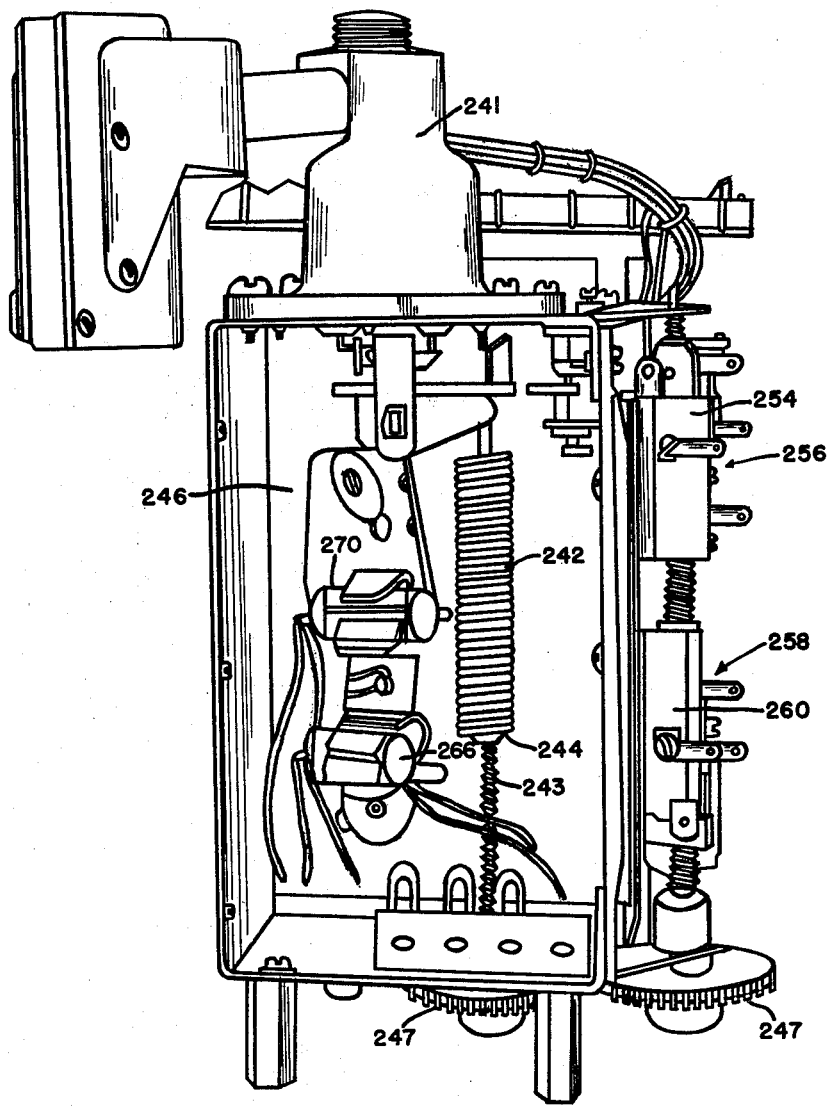
Figure 9:
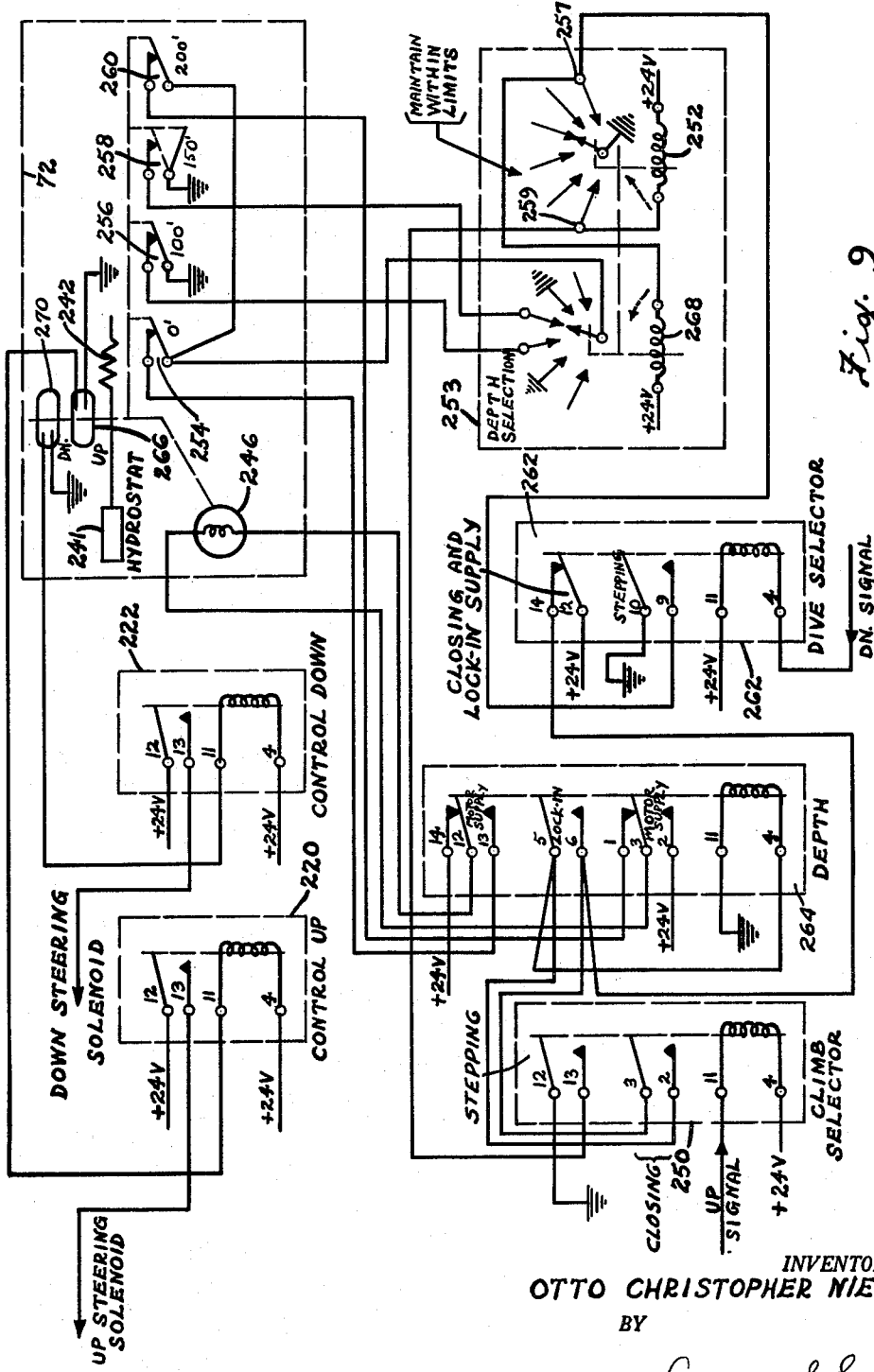
FIG. 9 is a schematic diagram of the depth control circuitry.

The operation of the depth circuit is as follows: the depth control unit 72 is shown in FIGS. 7a and 7b. Programming in depth is accomplished by changing the tension of the depth control spring 242 in the depth control unit. This is done through the use of a motor driven worm gear 243 and follower 244. The depth control motor 246 drives the worm gear 243 through gears 247 controlling the tension of the spring 242 and the position of the depth motor follower cam 248. Four depths have been selected as typical desirable depths for submarine simulator operation, 0', 100', 150' and 200'. The depth control circuit functions in the following manner. FIGS. 6a–6f show the device set for operation at 150'. FIGURE 9 shows a simplified view of the depth control circuitry. The up and down signal leads from the programmer finger element 200, control the selection of the depth by grounding the appropriate signal finger. For example, momentary grounding of the up signal finger U causes the climb selector relay 250 to energize. The climb selector contacts 12–13 close the circuit to one coil 252 of the bi-directional rotary relay 253 which places into the circuit, one of the depth limit switches 254, 256, 258 or 260. The closing contacts 3–2 of the climb selector relay 250 complete the circuit via the 14–12 contacts of dive selector relay 262 for depth relay 264 which is self-locking through its own 5–6 contacts. The depth motor supply contacts 1, 3, 2 and 14, 12, 13 of depth relay 264 complete the depth motor circuit in such a manner via the 3–2 and 12–13 contacts, that the motor turns to decrease spring tension in the depth controller. This action continues until the limit switch set, is opened by the depth motor follower cam 248 and the motor stops running. Thus, a new depth is selected. The up mercury switch 266 is tilted to close the circuit to the control up relay 220 which in turn closes the circuit through its 12–13 contacts to the up steering solenoid 142. When the device reaches the new selected depth, the mercury switches are reoriented hydrostatically so as to maintain this depth. Selection of a greater depth is initiated in the programmer by grounding momentarily the down signal finger D. This action energizes the dive selector relay 262 which: energizes depth selector coil 268 of the bi-directional rotary relay 253 through 10–9 contacts of the dive selector relay 262, to select a limit switch in the depth control which represents a greater depth; unlocks depth relay 264 by opening the 14–12 contacts of dive selector relay 262 which in turn, through contacts 3–1 and 12–14 of the depth relay 264, causes the depth motor 246 to run in such a direction that spring tension of depth spring 242 is increased. The down mercury switch 270 is closed. The control down relay 222 is energized and down steering solenoid 144 is energized through contacts 12–13 of control down relay 222. The depth motor 246 runs until the depth limit switch is opened by the depth cam 248. In the event the programmer should malfunction to select a depth greater than 200′ or less than 0′, the depth limit contacts 257 and 259 of relay 253 automatically resets the selector relay to the maximum or minimum depth setting by energizing coil 268 or 252. It should be noted that the 0′ and 200′ switches 254 and 260 open the circuit for the depth motor thus preventing over travel. Steady running at a given depth after this given depth has been obtained is accomplished as follows: if the device goes deeper than selected, the hydrostat 241 acting against the preset spring 242 tilts the mercury switches 266 and 270 in such a manner that the up switch 266 makes contact and an up control signal is given to the up control relay 220 which in turn actuates the up steering solenoid 142 and the device climbs until the hydrostatic pressure is balanced by the spring tension and the mercury switches again assume a neutral open position. A similar action occurs when the device rises above the selected depth, now via the down mercury switch 270, the down control relay 222 and the down steering solenoid 144.

Stop

When the S finger on the programmer finger element 200 contacts the platen 202, the circuit for stop relay 212 is completed, via its contact 11, contact 4 being plus 24 volts. The contacts 3–12 and 1–14 of this relay open the ground for the start relay 210 coil, thus breaking the lock-in circuit. The contacts of relay 210 open and the device reverts to its initial conditions ready for a radio signal. This is accomplished as follows: contacts 5–6 open and the gyro stops spinning; contacts 5–7 close and the radio start receiver and the direction finder transmitter are again energized. The 8–10 and 12–14 contacts close causing the antenna erection motor to run in the erect direction. This continues until the circuit is broken by the up limit switch 150 of the antenna erection mechanism. The hydrostat switch 158 remains open until the device reaches the surface preventing the antenna erection under water, where the antenna may be damaged by the water drag. When the erection motor starts in the erect direction, the down limit switch 152 contacts 2–3 open, removing power from the auxiliary start relay 216 which now opens. The circuit for the gyroscope recage 280 is completed through the 5–7 contacts of auxiliary start relay 216. The program motor 190 runs with power going through the 5–7 contacts of time delay number 2 relay 232 until the heater of the time delay number 2 relay cools, thus clearing the stop command on the program tape. The device is now back to its initial condition and ready to start a new run.

Stopping of device can also be accomplished by a "hit" with a practice depth charge. This is accomplished by inserting the "stop-on-hit" jumper 213 before the device is launched. A ground signal from the depth charge amplifier will now act in the same manner as a stop command from the program tape to stop the device.

Run limiter

If only one run is desired, the "stop-lock-in" jumper 215 is inserted before the device is launched. When a stop signal is received, either from a programmed stop command or a "hit," the stop relay will lock in via its own 12–13 contacts, preventing the start relay from closing due to the open circuit between the 3–12 and 1–14 contacts of the stop relay. The stop relay can be unlocked by reinserting the pin in the lanyard start switch. The device can now be relaunched and restarted and will proceed to follow the remaining programmed run.

"Hit recorder"

An additional feature of the device is the recording of time at which a depth charge "hit" was made on the device without ending the program. This is accomplished by means of the recorder solenoid 229 which is mounted directly above the platen 206 of the programmer. When this solenoid is actuated a marking pencil puts a mark on the program tape 198. After an operation the program can be inspected and the time(s) of a hit(s) determined. Positive voltage for this marker is supplied directly from the battery, and ground is furnished from the depth charge sensing circuit. The circuit is via the 5–7 contacts of the stop relay, so that the recorder solenoid is not activated while the stop relay is locked in, during the time the device is being recovered after an operation. The recorder solenoid may or may not operate on normal stop commands. If the recorder solenoid operates before the stop relay operates, then the 5–7 contacts of the stop relay will be closed and a mark will be obtained. If, however, the stop relay operates before the solenoid, the 5–7 contacts will be open and no mark will be made on the program tape.

The circuit for the gyroscope recage is completed through the 5–7 contacts of auxiliary start relay 216.

Submarine noise simulation

The simulator is provided with an electronic submarine noise simulating mechanism. The attainable variations of frequency and amplitude are such that adjustment results in the reasonable matching of the characteristic noises of different types of submarines. This sonic simulation is present any time the device is in the water, either surfaced or submerged, unless an interval of silent running has been programmed. Sonic simulation provides a suitable signal for tracking the simulator with listening sonar or with sonar buoys. When the instant invention is immobile on the surface, the sonic noises serve as an aid in locating it. With the device surfaced, the sonic simulator will always emit simulating noises regardless of the programming or initial setting errors. The noise simulation circuits are described in detail in Patent No. 3,092,684, issued June 4, 1963.

Echo repeater and echo elongator

The device is equipped with an electronic system which picks up the pulses of active sonar in the 18 kc. to 30 kc. range, amplifies them, and then retransmits the pulses with sufficient power to simulate the echo from a real submarine. In addition, the length of the returning echo is controlled in such a fashion that the echo will seem to have emanated from the bow, beam, or quarter depending upon bearing. The target size is adjustable.

Figure 3:
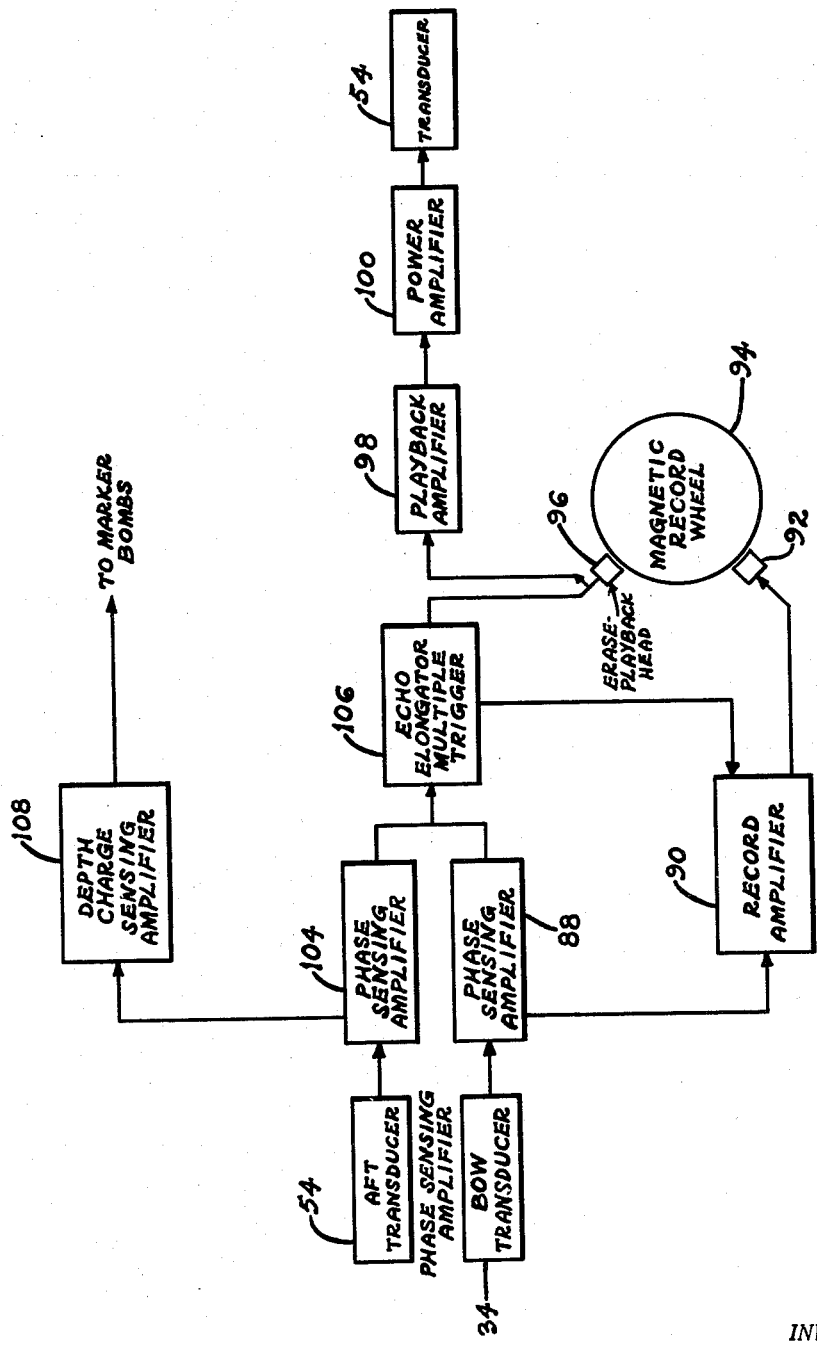
FIG. 3 is a block diagram of the echo repeater system.

The echo repeater, echo elongator circuits are the subjects of a Patent No. 2,887,671, issued May 19, 1959. A block diagram of these circuits is shown in FIG. 3. The operation of these circuits is as follows. With reference to FIG. 1, there is shown the submarine simulator. The wave-front of an incoming sonar ping is shown at 84 and is illustrated as a plain wave-front due to the distance to the sonar source. The simulator has a bow transductor 34 and an aft transducer 54 respectively called the receiving hydrophone and the transmitting transducer; the aft transducer 54 being spaced away from bow transducer 34 approximately one-half wave length at the center frequency of the system. The impinging wave-front shown at 84 may approach the simulator from aft, abeam or from the bow, and the system of echo elongation and echo repetition, which will be described, will operate equally well. The function of the simulator, which is only eleven feet long, is to appear like a 300 foot or 400 foot submarine to the sonar operator located at a distance away from the simulator. Thus, the signal which the simulator sends back to the sonar operator must, in amplitude and duration, be equivalent to the reflection from a submarine which is for example 40 feet in diameter and 400 feet long. Furthermore, the "reflected" signal from the simulator must "sound like" a submarine at all angular relationships between the sonar source and the simulator. To do this, the simulator repeats the incoming signal, sending it back to the sonar operator with amplification, and it elongates the "echo" by an amount which is a function of the size of a submarine which the device is simulating and by an amount dependent upon the angle between the wave-front 84 and the longitudinal axis of the hull of the simulator. The greater this angle, up to 90 degrees, the shorter the "echo," and at 90 degrees the echo length is approximately equal in length to that of the received sonar ping. The "echo repeater" circuit operates in conjunction with the bow transducer 34, which receives the incoming sonar ping, amplifies it at 88 and again at the recording amplifier 90 and applies the signal to the input of a magnetic recording head 92. The magnetic recording head 92 records the signal on the rapidly rotating magnetic wheel 94. The diameter of the wheel 94 is small and its rate of rotation is sufficiently high so that the recorded signal occupies the full 360 degree path around the wheel. If the incoming "sonar ping" is long and occupies more than 360 degrees of rotation it does not disturb the operation of the device. When the signal magnetically recorded on wheel 94 reaches the erase-playback head 96, it is reproduced, amplified at 98 and 100 and is applied to the aft transducer 54 where it is sent back to the sonar operator in the form of an amplified "echo," strong enough to appear to have been reflected from a large submarine.

The elongator circuit computes the duration of the "echo" in accordance with the size of the "submarine simulated," the length of the ping, and in accordance with the aspect angle between the wave-front 84 and the axis of the simulator. The size of the submarine is fixed, but the aspect angle varies and the length of the ping may vary.

When the wave-front 84 approaches from the beam, the aft and bow transducers receive the impulse simultaneously and the arrival time difference of the two transducers will be zero. However, at bow or stern aspects the arrival time difference may reach a maximum of about .9 millisecond because of the hydrophone spacing of about five feet and the speed of sound in water. With the device of this invention it makes no difference whether the bow or the aft hydrophone is first energized by the incoming signal, as the circuit operates to repeat any elongated signal in accordance with the aspect angle no matter which of the two hydrophones first receives the impulse. The magnetic head 96, in addition to being a playback or reproducing head, also serves to erase the magnetic signal recorded on the magnetic wheel 94 following each transmission. When a sonar ping is first received by the aft transducer 54, the transducer output is amplified at 104, limited and rectified at 104 and used to start a trigger circuit 106. The output from the trigger circuit is amplified to the erase-playback head 96. This signal applied to the erase-playback head 96 terminates the action of the elongator circuit. Either hydrophone can start the action of the coincidence detector circuit upon first receiving the sonar ping, and the other hydrophone then terminates the action of the coincidence detector circuit, the flip-flop circuits and the coincidence detector producing a signal whose duration is dependent upon the time delay between the two hydrophones receiving the sonar ping. Thus, a signal will be sent out of the transducer 54 whose duration is equal to the time interval of the original sonar ping as received by transducer 34 plus a time inteval dependent upon the receipt of the ping at the two hydrophones 34 and 54. The signal recorded on the magnetic wheel 94 is reproduced for a length of time equal to the length of time of the sonar ping plus the time delay between the first and second transducers receiving the sonar ping. During this time the wheel 94 may rotate several complete revolutions while the reproduced signal is being sent back to the sonar operator, thus simulating a large size submarine. The frequency of the signal returned to the sonar operator will be the same as the incoming sonar signal, since the signal was recorded directly on the magnetic wheel and was reproduced therefrom and applied to the air transducer for transmittal back to the sonar operator.

*Radio starting*

The device is equipped with a miniature radio receiver for remote starting purposes. This radio is set to operate in the 27 mc. band. The companion target actuator transmitter is illustrated and fully described in now abandoned application, Serial No. 38,683, filed June 24, 1960. The antenna for the receiver and the radar reflector are one unit. They are described and fully illustrated in now abandoned application, Serial No. 177,141, filed March 2, 1962.

*Snorkel Simulation*

A reflector which provides a return which is similar to that produced by a submarine snorkel is incorporated in the instant invention. The radar reflector is automatically retracted before the device dives. Retraction of the radar reflector and the radio start antenna is a prerequisite to diving. The simulator may be caused to run at slow speed on the surface with the snorkel simulator erected by making a small change in the mechanism.

*Hit indicator and end of run indicator*

The submarine simulator is equipped with a four-barreled marker bomb which can eject any or a combination of the following types of markers: (*a*) Colored buoyant disks; (*b*) oil for simulating an oil slick; (*c*) a buoyant dye cartridge which rises to the surface and allows the dye to diffuse.

Ejection of the above materials occurs when a depth charge is dropped sufficiently close to the target simulator to be considered in the homing range of an acoustic torpedo. This feature gives a visual indication of a hit to the personnel who have been tracking the device in surface ships or in aircraft. An alternate method of hit indication may be selected. In this case, the simulator is caused to rise to the surface and suspend operation when a "hit" is made. Following such a stoppage, the program may be started again by radio. The program in this case begins at the point where it was interrupted. The marker bombs are used to mark the end of an exercise or the end of a portion of an exercise. The hit indicator is described in detail in now abandoned patent application, Serial No. 38,683, filed June 24, 1960.

*Radio beacon transmitter*

To provide a signal adequate for remote location of a target simulator by direction finding equipment, a small transmitter is incorporated in the instant invention which produces a radio signal when the device is on the surface of the water. The transmitter may be operated in the 119 mc. or 1038 mc. regions. The radio beacon transmitter is described in detail in the now-abandoned patent application, Serial No. 38,683, filed June 24, 1960.

Low voltage cut-out

When the lanyard switch 80 is closed the dynamotor 45 is activated via the dynamotor relay 47, the low voltage cut-out relay 290 closes making a thorough circuit via its 3-2 contacts to the lock-in contacts 5-6 and 3-2 of start relay 210. Prior to activation of the start relay 210 this voltage passes through the 5-7 contacts of relay 210 to activate the radio start relay 134. Low voltage cut-out relay has an adjustable spring 292 which causes the relay to drop out when the coil voltage drops below the selected value. When the voltage drops low enough to endanger the battery or cause erratic operation of the various relays and controls, low voltage relay 290 drops out, removing the lock-in voltage for start relay 210, and the device follows the same procedure as if the start relay had opened due to activation of the stop relay 212, with one exception; the radio start relay 134 does not close and the device cannot be restarted. Low voltage relay 290 will close on about 24 volts and hold until the voltage drops to about 22 volts. When the various loads are removed from the battery, after the unit has stopped, the battery voltage (open circuit) may go back up to about 23 volts, but not enough to reclose the low voltage cut-out relay 290.

Antenna retraction

When the device is lifted out of the water after an operation, as in helicopter recovery, the antenna-reflector 23 retracts. This is accomplished as follows: when the hydrofloat 82 is removed from the water, the switch actuates, putting voltage of such a polarity on the erection motor 154 to cause it to run in the antenna retract direction. When the antenna is retracted the down limit switch 152 opens, stopping the antenna erection motor.

Sequence of operation

The detailed sequence operation of the instant invention is as follows. When launched from a helicopter, the lanyard operated switch closes to provide voltage for the erection of the radar reflector, the radio receiver, and the direction finding beacon antennas. The simulator device lies dormant on the surface of the seat with the radio receiver turned on to receive starting signals with the direction finding transmitter functioning, with the sonic simulator providing submarine-like noises, and with the radar reflector erected. Reception of the radio signal from the target actuator transmitter causes the radar and radio appendages to be retracted in about thirty seconds. When these are down and locked, the simulator commences on the surface and submerges within twenty seconds. The programmer is put into operation, echo repeating and echo elongation becoming possible, and the device operates under the control of the programmer. Once under way the programmer can produce any of the following functions: (a) silent running or noise simulation; (b) azimuth steering; (c) depth change, up or down; (d) change in speed, four knots or ten knots; and (e) stop. At any time the programmer calls for stopping, the device rises to the surface, erects its radar and radio appendages, and becomes armed for starting again.

Deviations from normal operation sequence

Provision is made for starting the instant invention as soon as it enters the water if desired. When this circuit alteration is used, the radar and radio devices will not function. Another alteration causes the device to surface on information from the close depth charge attack.

Special circuits

When the device is lifted from the water by helicopter or other means, the externally erected devices automatically retract. If for any reason the propulsion battery charge falls below a safe value, the device automatically stops. A hydrostatic switch prevents erection of the external appendages until the device surfaces.

A résumé of the sonar simulator is as follows: It performs typical submarine maneuvers for preset periods with a cruising speed of four knots and short bursts at ten knots. It will receive and retransmit sonar pulse tracks the same as if an actual submarine were passing through the sonar beam. Simultaneously, the simulator will generate and transmit propeller beats and the internal machinery noise characteristics of a running submarine. At the end of each run the target will surface and eject a quantity of dye for the dye marker. In addition to this visual aid to recovery a signal will be transmitted from the echo repeater to permit location by sonar. Propulsion and guidance are controlled by the programmer which comprises a moving 35 mm. film tape which passes between a rotary platen and seven contact fingers. Slots punched in the tape permit one or more contact fingers to become grounded for a short period. Grounding a contact finger actuates a corresponding relay to operate one of seven functions: speed change, port turn, starboard turn, shallow stratum and deep stratum, quiet operation and stop. At the end of a run the programmer actuates a relay to bring the target to the surface.

Obviously many modifications and variations of the present invention are possible in the light of the above teachings. It is therefore to be understood that within the scope of the appended claims the invention may be practiced otherwise than as specifically described.

What is claimed is:

1. A submarine simulator comprising, in combination: a torpedo-like hull, said hull bearing
   - depth-control means for causing said simulator to operate at certain predetermined depths, said means finding the proper depths in response to hydrostatic pressures,
   - course-control means for controlling the azimuthal direction of said simulator,
   - programming means for sending control signals to said depth-control and said course-control means in accordance with a predetermined program of depth and course maneuvers which said simulator is to perform,
   - echo-repeater means for receiving a sonar search pulse, amplifying it to a level appropriate for an echo return from a real submarine, and propagating the amplified echo signal through the water,
   - means for placing said simulator in readiness for active operations, and
   - radio receiving means having an erectable antenna for receiving a command signal and for starting the operation of said programming means in response thereto.

2. A simulator as described in claim 1, and including sonic-simulator means for producing and propagating through the water the sounds made by a real submarine.

3. A simulator as described in claim 2, and including hit-indicator means for sensing when a depth bomb explodes close enough to said simulator to be considered as having disabled the submarine which is being simulated and for making a visual indication of such disablement.

4. A simulator as described in claim 1, further including hit-indicator means for sensing when a depth bomb explodes close enough to said simulator to be considered as having disabled the submarine which is being simulated and for causing said simulator thereupon to rise to the surface of the water and to suspend active operations.

5. A simulator as described in claim 4, and including stop-on-hit means for stopping the active operations of said simulator when said hit-indicator means senses a hit.

6. A simulator as described in claim 5, and including radio-transmitter means for sending radio beacon signals when said antenna of said radio receiving means is erected.

7. A simulator as described in claim 6, further including erectable radar beam reflector means, said means erecting itself whenever said simulator is on the surface of the water.

8. A simulator as described in claim 7, further including run-limiter means for preventing further active operations whenever a stop signal is given by said programmer.

9. A simulator as described in claim 1, and including echo-elongation means for modifying said amplified echo signal in accordance with the aspect angle between the incoming sonar search pulse and the longitudinal axis of the hull of the simulator.

References Cited by the Examiner
UNITED STATES PATENTS

| | | | |
|---|---|---|---|
| 1,664,549 | 4/28 | Hammond | 114—21 |
| 2,363,363 | 11/44 | Rubissow | 114—23 |
| 2,414,449 | 1/47 | Chapin | 114—25 |
| 2,447,069 | 8/48 | Holcomb | 340—2 |
| 2,710,458 | 6/55 | Reed | 35—10.4 |
| 2,887,671 | 5/59 | Frankel | 340—2 XR |
| 2,938,483 | 5/60 | Mason | 144—20 |

BENJAMIN A. BORCHELT, *Primary Examiner.*

CHESTER L. JUSTUS, SAMUEL FEINBERG,
*Examiners.*